(12) United States Patent
Raikamo (10) Patent No.: US 10,788,009 B2
(45) Date of Patent: Sep. 29, 2020

(54) DEVICE FOR RECOVERING WAVE ENERGY

(71) Applicant: FINN ESCONE OY, Lempäälä (FI)

(72) Inventor: Esko Raikamo, Lempäälä (FI)

(73) Assignee: FINN ESCONE OY, Lempäälä (FI)

( * ) Notice: Subject to any disclaimer, the term of this patent is extended or adjusted under 35 U.S.C. 154(b) by 0 days.

(21) Appl. No.: 16/177,627

(22) Filed: Nov. 1, 2018

(65) Prior Publication Data
US 2019/0128237 A1    May 2, 2019

(30) Foreign Application Priority Data

Nov. 2, 2017 (FI) .................................. 20174246 U (51) Int. Cl.
*F03B 13/00* (2006.01)
*F03B 13/14* (2006.01)
(Continued)

(52) U.S. Cl.
CPC ............ *F03B 13/14* (2013.01); *F03B 13/183* (2013.01); *F03B 17/061* (2013.01); *F16H 1/203* (2013.01);
(Continued)

(58) Field of Classification Search
CPC ...... F03B 13/14; F03B 13/183; F03B 17/061; H02K 7/1823; F05B 2210/404;
(Continued)

(56) References Cited

U.S. PATENT DOCUMENTS

| 4,110,630 A * | 8/1978 | Hendel ................... F03B 13/12 |
| | | 290/42 |
| 6,220,906 B1 * | 4/2001 | Dubois ..................... B63H 5/10 |
| | | 114/20.1 |

(Continued)

FOREIGN PATENT DOCUMENTS

| JP | 10-288139 | 10/1998 |
| WO | 98/21473 | 5/1998 |

(Continued)

OTHER PUBLICATIONS

Search Report for FIU20174246 dated Dec. 19, 2017, one (1) page.

*Primary Examiner* — Julio C. Gonzalez
(74) *Attorney, Agent, or Firm* — Nixon & Vanderhye P.C.

(57) ABSTRACT

The invention relates to a device for recovering wave energy, the device including a drum which is adapted to rotate around its centre axis and inside which an electric generator is adapted, arranged to be rotated by the rotating motion of said drum. In order for the device to recover energy better than prior art devices, the device includes at least one wing adapted on the outside of the drum, the wing being arranged to turn in such a way that it may be turned from a first position to a second position whereby, as the wing is in its first position, the motion of water in a first direction of the drum centre axis is arranged to rotate the drum in a first direction, and as the wing is in its second position, the motion of water in a second direction of the drum centre axis is also arranged to rotate the drum in said first direction, and the turning of the wing is arranged to take place under control of a pressure sensor.

7 Claims, 6 Drawing Sheets

(51) Int. Cl.
  *H02K 7/02*   (2006.01)
  *H02K 7/116*  (2006.01)
  *H02K 7/18*   (2006.01)
  *F16H 19/04*  (2006.01)
  *F16H 1/20*   (2006.01)
  *H02K 7/102*  (2006.01)
  *F03B 17/06*  (2006.01)
  *F03B 13/18*  (2006.01)
  *G01F 1/58*   (2006.01)

(52) U.S. Cl.
  CPC ............... *F16H 19/04* (2013.01); *H02K 7/02* (2013.01); *H02K 7/102* (2013.01); *H02K 7/116* (2013.01); *H02K 7/1823* (2013.01); *F05B 2210/404* (2013.01); *F05B 2240/13* (2013.01); *F05B 2260/5032* (2013.01); *F05B 2270/301* (2013.01); *G01F 1/58* (2013.01); *Y02E 10/28* (2013.01); *Y02E 10/38* (2013.01)

(58) Field of Classification Search
  CPC ......... F05B 2240/13; F05B 2260/5032; Y02E 10/28; Y02E 10/38

USPC .................................................... 290/42, 54
  See application file for complete search history.

(56) References Cited

U.S. PATENT DOCUMENTS

| | | | |
|---|---|---|---|
| 7,908,854 B2* | 3/2011 | Raikamo | F03B 13/181 |
| | | | 60/498 |
| 8,698,331 B2* | 4/2014 | Carter | F03B 13/22 |
| | | | 290/42 |
| 9,683,544 B2* | 6/2017 | Yu | F03B 13/22 |
| 2010/0066089 A1 | 3/2010 | Best et al. | |
| 2010/0290908 A1* | 11/2010 | Denniss | F03B 13/142 |
| | | | 416/147 |
| 2012/0124986 A1* | 5/2012 | Carter | F03B 13/22 |
| | | | 60/398 |
| 2015/0082785 A1* | 3/2015 | Rohrer | F03B 13/182 |
| | | | 60/500 |

FOREIGN PATENT DOCUMENTS

| | | |
|---|---|---|
| WO | 2007/009163 | 1/2007 |
| WO | 2008/093037 | 8/2008 |

* cited by examiner

DEVICE FOR RECOVERING WAVE ENERGY

This application claims priority to FI Patent Application No. 020174246 filed Nov. 2, 2017, the entire contents of which are hereby incorporated by reference.

BACKGROUND

The invention relates to a device for recovering wave energy, the device comprising: a drum which is adapted to rotate around its centre axis and inside which an electric generator is adapted, arranged to be rotated by the rotating motion of said drum.

The drawback with the existing wave power plants is that they are not able to capture efficiently the energy that the motion of water contains.

BRIEF DISCLOSURE

An object of the present invention is to provide a novel and improved device for recovering wave energy.

The invention provides a device for recovering wave energy, the device comprising:

a drum which is adapted to rotate around its centre axis and inside which is adapted an electric generator, which is arranged to be rotated by means of the rotating motion of said drum, wherein the device further comprises at least one wing adapted on the outside of the drum to receive the motion of water, the wing being adapted to turn so that it may turn from a first position to a second position, whereby as the wing is in its first position, the motion of water in a first direction of the drum centre axis is arranged to rotate the drum in a first direction, and as the wing is in its second position, the motion of water in a second direction of the drum centre axis is also arranged to rotate the drum in said first direction, and wherein further the turning of the wing is arranged to take place under control of a pressure sensor.

In the invention it is essential that the device for recovering wave energy comprises wings whose position may be altered so that the motion of water in the first as well as in the opposite second direction rotates the drum and, driven by it, an electric generator in one and the same direction. Essential is also that the turning of the wing is arranged to take place under control of a pressure sensor.

Preferred embodiments of the invention are disclosed in the attached dependent claims.

One of the advantages of the invention is that energy may be recovered better than before.

BRIEF DESCRIPTION OF THE FIGURES

The invention is now described in greater detail in connection with some embodiments and with reference to the accompanying drawings, in which.

For reasons of clarity, some embodiments of the invention are illustrated in the Figures in a simplified form. In the figures, like reference numerals identify like elements.

DETAILED DESCRIPTION

Figure 1A:
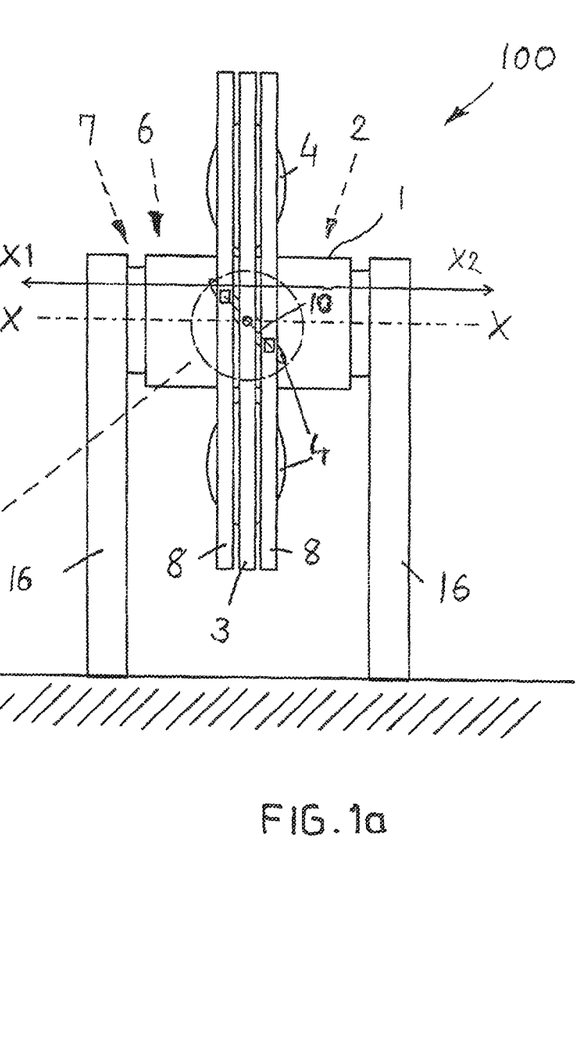
FIGS. 1a to 1c are schematic views of a device according to an embodiment for recovering wave energy.
Figure 1B:
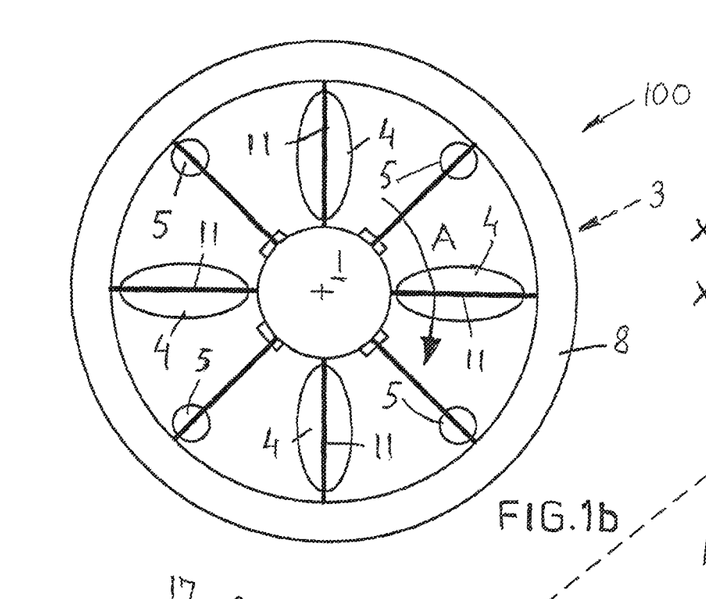
Figure 1C:
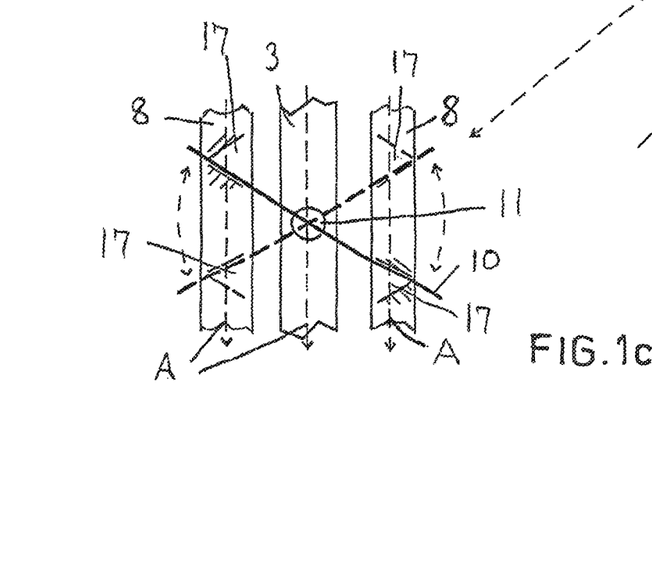

FIGS. 1a to 1c are schematic views of a device 100 according to an embodiment for recovering wave energy. The device 100 is fastened in place by means of a supporting structure 16 to the bottom of a sea or a similar water basin, or to another fixed structure.

The device 100 comprises a drum 1 adapted to rotate around its centre axis X-X. Inside the drum 1, an electric generator 2 is adapted, which is arranged to be rotated by means of the rotating motion of said drum 1. In an embodiment, the device 100 comprises a transmission 6 which is adapted to alter the speed of the rotating motion and the convey the rotating motion of the drum 1 in an altered form to a rotating motion of the electric generator 2. Alternatively, the drum 1 may be directly connected to the electric generator 2 without the transmission.

In an embodiment, the device 100 comprises, adapted to rotate with the electric generator 2, a flywheel 7 which balances out and maintains the rotating motion.

The device 100 additionally comprises an annulus 3 which is adapted at a distance from the drum 1 and to rotate fixedly with the drum around its centre axis X-X. Between the drum 1 and annulus 3, at least two wings 4 are adapted, which receive the motion of water. The embodiment shown in FIGS. 1a to 1c has four wings 4. The number of wings may be lower or higher than this.

The wings 4 are adapted to turn so that they may turn from a first position (or angle) to a second position (or angle). When the wing 4 is in its first position, the motion of water in a first direction X1 of the drum centre axis X-X tries to turn, or rotate, the drum 1 in a first direction A. In an embodiment, the device 100 comprises a freewheel clutch which allows the drum 1 to turn to the first direction A, only. When the motion of water changes direction and takes place in a second direction X2 of the drum 1 centre axis X-X, the wing 4 turns to the second position in which the wing 4 still seeks to rotate the drum 1 into the first direction A, so the same direction as the motion of water in the first direction X1. In other words, the electric generator 2 rotates all the time in the same direction regardless of the changes in the direction of water motion.

The direction of water motion and changes in it are detected by a pressure sensor 5, arranged to control the turning of the wings 4. The pressure sensor 5 may comprise a magnetic flow meter, for example.

In the embodiment of FIGS. 1a to 1c, the wing 4 is arranged to turn by two idler wheels 8.

The idler wheel 8 is adapted parallel to the annulus 3 and in its direction, and adapted to rotate around the drum 1 centre axis X-X. The rotating speed of the idler wheel 8 is arranged to change from a rotating speed slower than the rotating speed of the annulus 3 to a rotating speed faster than the rotating speed of the annulus 3 and back.

The idler wheel 8 is connected to a spoke 11 by means of a pivot arm 10. The spoke 11 may be said to be a rod-like axle. The spoke 11 for its part is connected to the wing 4, so the turning of the spoke 11 around its centre axis also turns the wing 4. The idler wheel 8 has appropriately formed adapters 17 which in the figure are conical openings, opening in the direction of the annulus 3. The adapter 17 may, of course, also be formed in another way.

The adapter 17 allows the pivot arm 10 to turn in relation to the idler wheel 8 and further in relation to the annulus 3 so that the idler wheel 8 may have a different rotating speed than the annulus 3. When the pivot arm 10 turns due to the speed difference the way the dotted lines in FIG. 1 illustrate, the wing 4 connected to the spoke 11 also turns.

It is pointed out that in a second embodiment, the device has one idler wheel 8, only.

Figure 2:
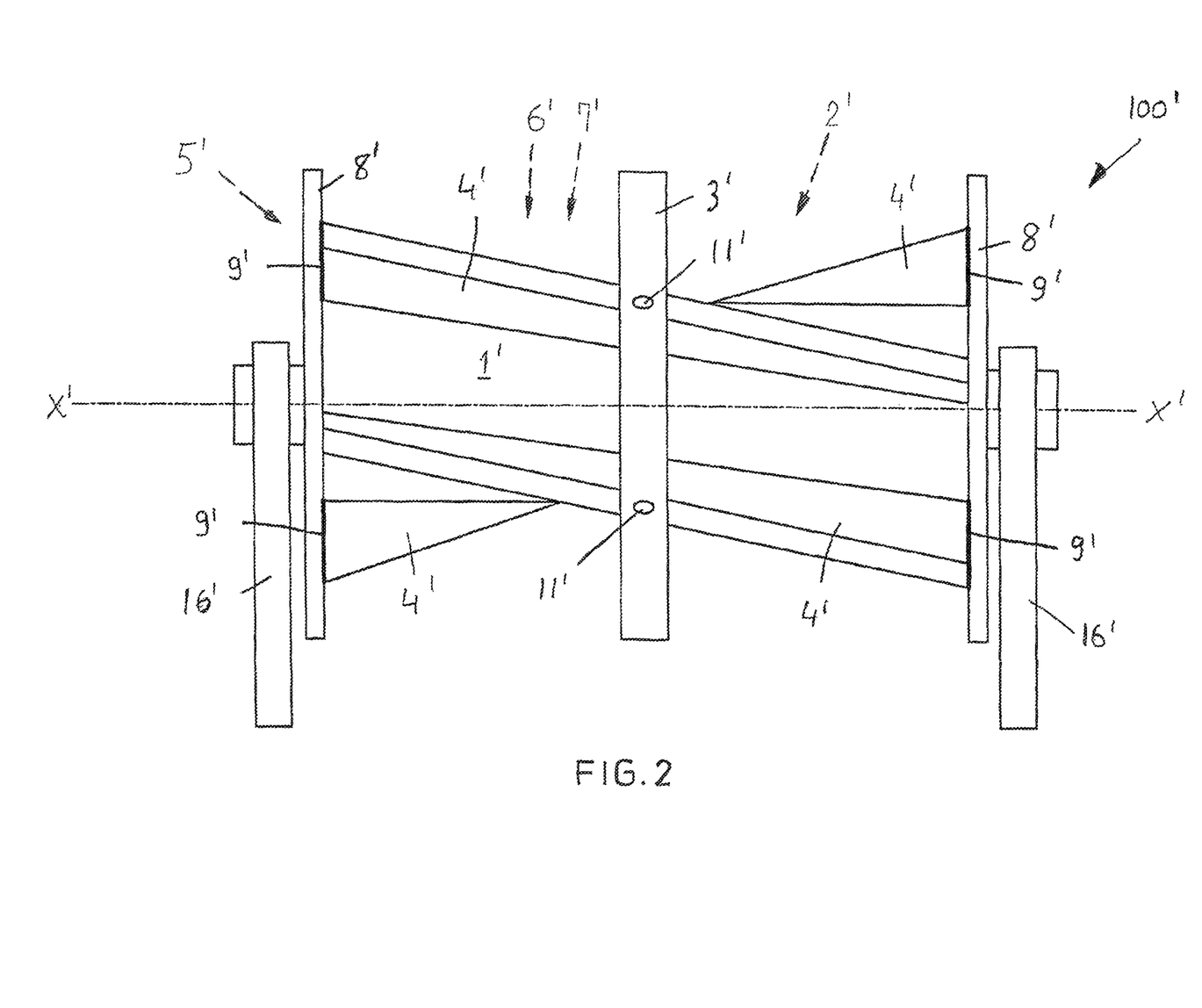
FIG. 2 is a side view of a device according to a second embodiment.

FIG. 2 is a side view of a device according to a second embodiment. The device 100' comprises four wings 4' adapted on the outer shell of the drum 1' and mostly in the direction of the drum centre axis X'-X'. The wing 4' is adapted to turn around the longitudinal axis of the spoke 11' from a first position to a second position and vice versa. The annulus 3' provides support for the spokes 11' and rotates at the same speed as the drum 1'.

Idler wheels 8' are adapted to the ends of the wings 4', and in the embodiment of FIG. 2, at the same time to the ends of the drum 1'. It should be noted that at least one of the idler wheels 8' is not connected to the drum 1', but may rotate faster or more slowly than the rotation speed of the drum 1'.

The idler wheels 8' are fixed to the wings 4' with a pivot arrangement 9', which allows the angle of the wing 4' to be changed in relation to the idler wheel 8' and also allows the wing end to move in the direction of the drum 1' centre axis X'-X'.

When the rotating speed of a first idler wheel 8' is slowed down or accelerated in relation to the annulus 3', and the speed of a second idler wheel 8' accordingly remains unchanged, or if the rotating speed of the second idler wheel 8' is oppositely changed than the rotating speed of the first idler wheel 8', the wings 4' turn from one position to the other. Due to the above, the motion of water always rotates the drum to one and the same direction regardless of the direction of water flow.

It is pointed out that in a second application of this embodiment, too, the device has one idler wheel 8', only.

In the embodiment of FIG. 2, as in the embodiment of FIGS. 1a to 1c, the turning of the wing 4' is arranged to take place under control of a pressure sensor 5'.

Figure 3:
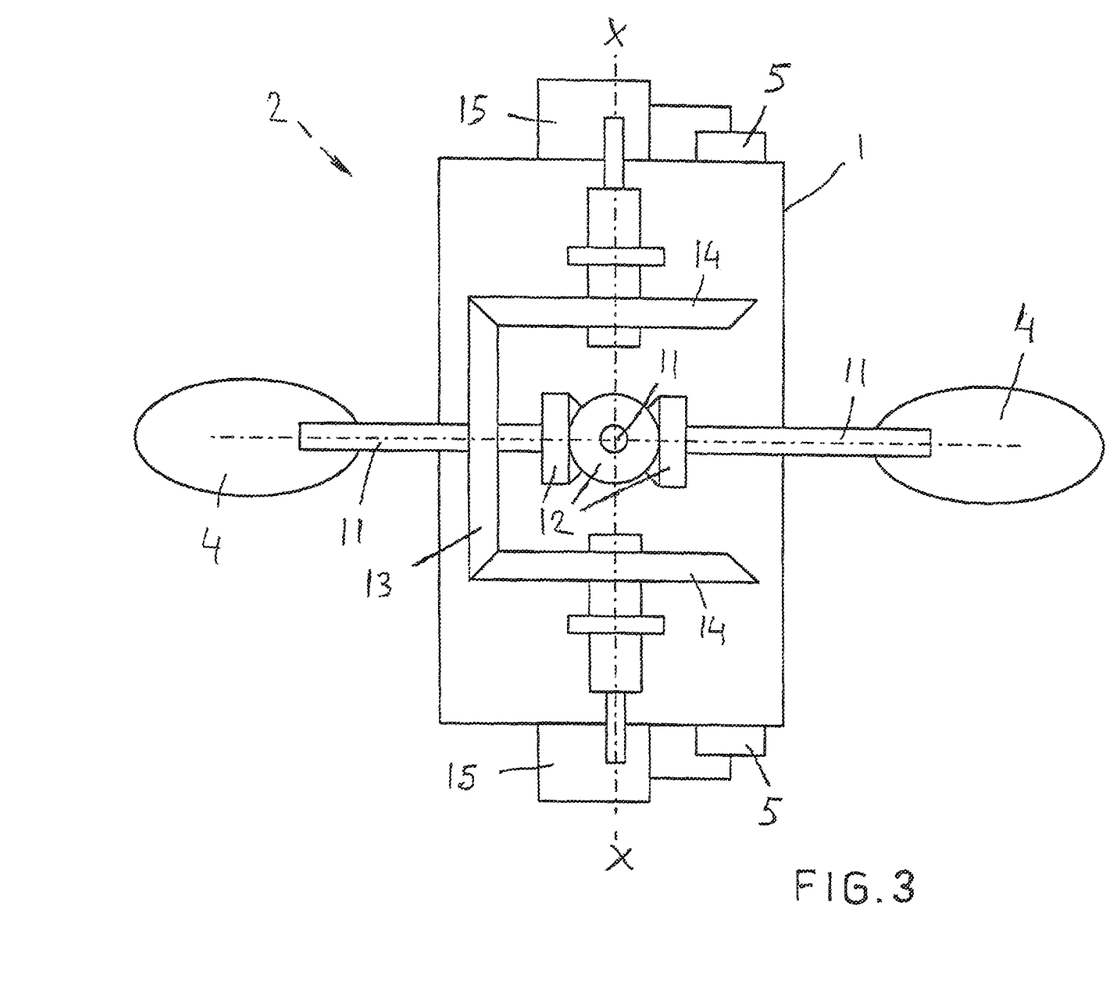
FIG. 3 is a partially sectional side view of some of the details of the device.

FIG. 3 is a partially sectional side view of some of the details of the device. According to an idea, the wing 4 is connected by means of the spoke 11 to a bevel gear 12 adapted inside the drum 1. The bevel gears 12 of different wings are coupled by a tooth contact to each other. In addition, one of the wings 4 or spokes 11 is connected to a large bevel gear 13 to rotate with it.

The large bevel gear 13 is meshed with an adjustment bevel gear 14, adapted concentrically with the drum 1 axis X-X and arranged perpendicularly in relation to the large bevel gear 13. The rotating speed of the adjustment bevel gear 14 is adapted to be slowed down by a brake device 15. The brake device, for its part, is controlled by the pressure sensor 5 already referred to in the above. The embodiment shown in FIG. 3 has two adjustment bevel gears 14 and brake devices 15.

When the direction of water flow remains unchanged, the adjustment bevel gears 14 do not rotate with the large bevel gear 13. When the pressure sensor 5 detects a change in the water flow direction, it controls one of the brake devices 15 to brake, so to slow down the rotating speed of the corresponding adjustment bevel gear 14, or even to stop it altogether. As a result, the large bevel gear 13 rotates in relation to said adjustment bevel gear 14, whereby the spoke 11 and wing 4 fastened to the large bevel gear 13 rotate correspondingly, and the same rotation motion is transmitted by the bevel gears 12 to the other spokes and wings 4. The rotation motion may be stopped by means of a simple limiter, or by suitably controlling the braking.

In a simpler embodiment, there is just one adjustment bevel gear 14 and one brake device 15.

Figure 4:
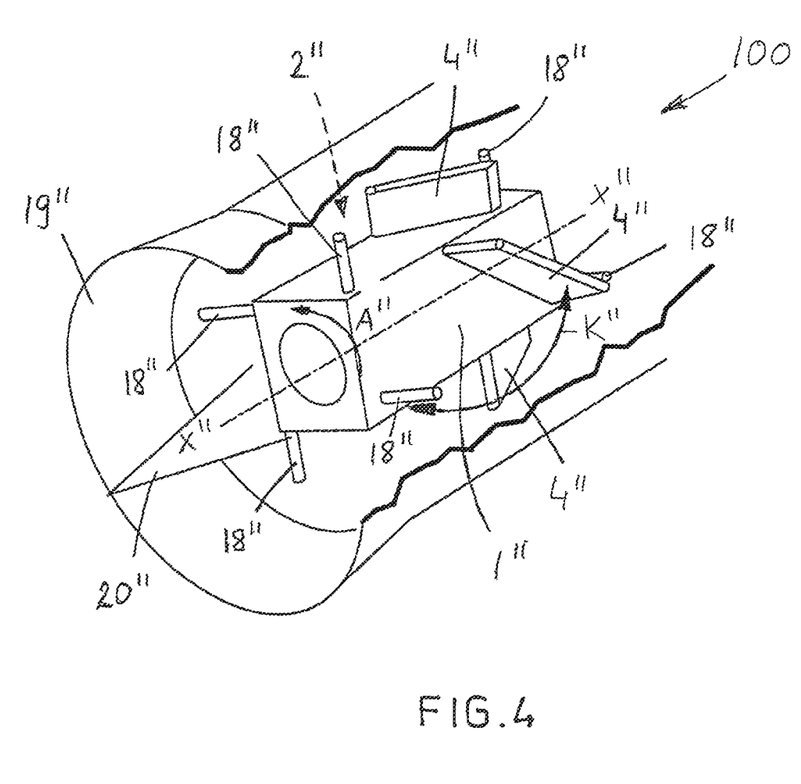
FIG. 4 is a perspective and partially sectional view of a third embodiment of the device.

FIG. 4 is a perspective and partially sectional view of a third embodiment of a device 100'''. It comprises a drum 1'' with a straight surface, on the outer surface of which four wings 4'' are adapted. It is pointed out that a drum 1'' with a straight surface may also be applied in the embodiments of the device, described in the above, and vice versa: a drum having the shape of a circular cylinder may be applied in the embodiment of FIG. 4. It is furthermore pointed out that the number of the wings 4'' may be higher than 4—no matter what the shape of the drum is—and that they may be adapted successively, in parallel, and/or overlapping on the outer surface of the drum.

The wings 4'' are arranged to turn as shown by the arrow K'' according to the direction of water flow between limiters 18'' so that the drum 1'' rotates in the first rotation direction A'' regardless of the flow direction.

According to an idea, the device 100'' comprises a gear arrangement shown in FIG. 3, which turns the wings when the water flow changes.

Around the drum 1'', a guide tube 19'' has been adapted, which directs and boosts water flow in relation to the wings 4''. The device 100'' further comprises a guide cone 20'' which directs water onto the wings 4''. It is pointed out that the guide tube 19'' and guide cone 20'' may also be used with the other embodiments described in this description.

Figure 5:
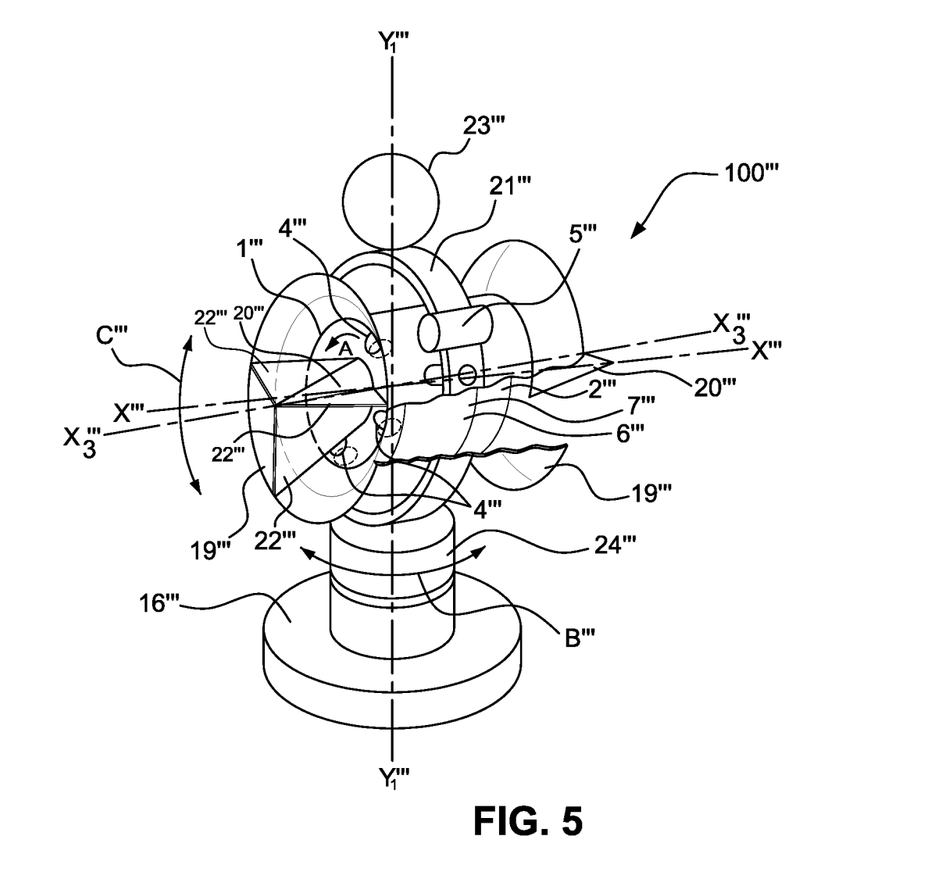
FIG. 5 is a perspective and partially sectional view of a fourth embodiment of the device.

FIG. 5 is a perspective and partially sectional view of a fourth embodiment of a device 100'''. The device shown in FIG. 5 is intended to be placed at the bottom of the sea, where strong water flow back and forth may take place, the direction of which may change. The device may installed both at an inclined and horizontal sea bottom. Water may flow inside the body 1''' of the device from both ends and towards the wings 4''' so that water only flows into the device 100''' only at the end facing the flow of water. The device 100''' acts as an actuator continuously rotating in one direction regardless of which end water flows inside the device. The device 100''' comprises a body part 24''' supporting by which the drum 1''', electric generator 2''' and wings 4''' (which are turnable like in the other embodiments of the invention), as well as advantageously also the transmission 6''' of the device. The turning of the wings is illustrated by drawing the wings 4'' additionally by a dotted line. The body part 24''' is fixed to the support structure 16''' of the device and adapted to turn in relation to the support structure so that it may turn back and forth in relation to vertical axis $Y_1'''$-$Y_1'''$ of the support structure, as indicated by the double arrow B'''. In case the device comprises, as in FIG. 5, two guide tubes 19''' pointing in opposite directions in relation to each other, the maximum of the turning angle may advantageously be 80 to 100 degrees, for example, which is practise allows for the device to turn enough for practical purposes. The drum 1''' and wings 4''' of the device and advantageously also the transmission 6''' and electric generator 2''' of the device are adapted to be tilted in relation to the support structure 16''', on horizontal axis $X_3'''$-$X_3'''$. The tilting of the device is illustrated the double arrow C'''. The horizontal axis $X_3'''$-$X_3'''$ is fastened to a body ring 21''' which surrounds the drum 1'''. It is conceivable that instead of the body ring 21''' another suitable body piece is used, allowing the tilting of the device body 1''' to the directions illustrated by the double arrow C'''.

The structure described in the above makes it possible for the drum 1''' and wings 4''' to turn three-dimensionally in relation to the support structure 16''' in different directions so that the device may always be turned against the water flow to achieve the best efficiency for the electric generator 2 of the device.

The embodiment of FIG. 5 comprises, just like the third embodiment of the invention, a guide tube 19''', guide cone 20''' (at both opposite ends of the device) as well as, like all the embodiments of the device, one or more pressure sensors 5'''. The guide cones 20''' are fixed to the guide tube 19''' by means of supporting plates 22''' or similar. The device preferably comprises a transmission 6''' and flywheel 7''' adapted to rotate with the electric generator 2'''. It is preferred that limiters are associated with the wings 4''' (not shown in the figure). Reference number 23''' indicates a gas container at the top part of the device 100''', which preferably has air in it. The gas container 23''' exerts an upward lifting force on the device 100''', which tries to set straight the position of the device so that the centre axis X'''-X''' of its drum 1''' sets horizontally.

Figure 6A:
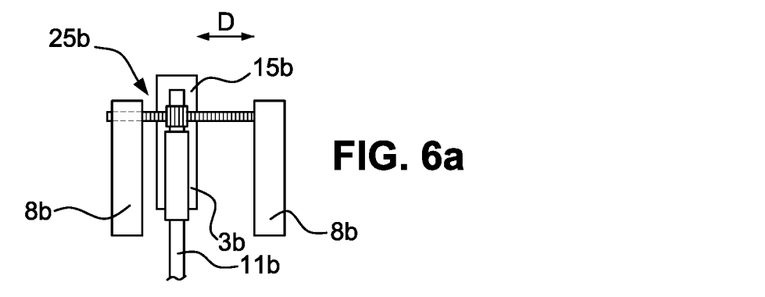
FIGS. 6a to 6c illustrate an arrangement for turning and locking a wing.
Figure 6B:
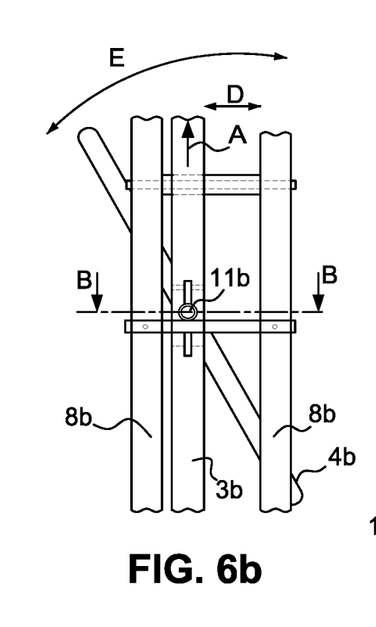
Figure 6C:
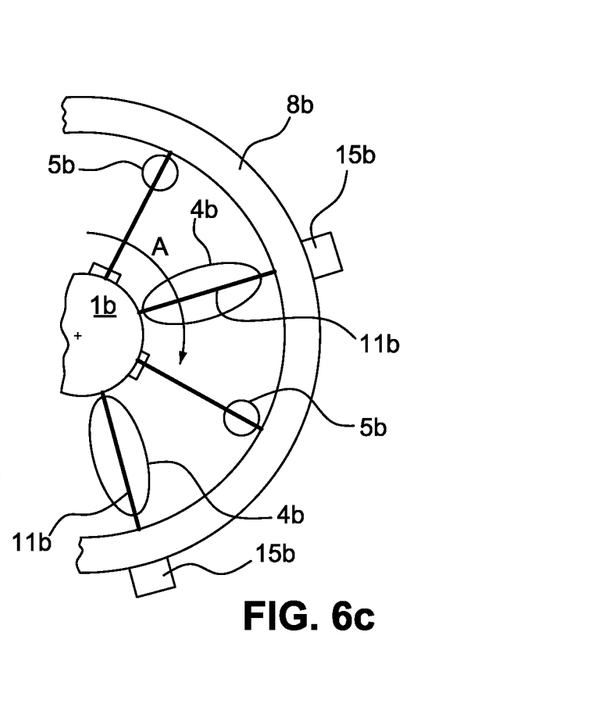

In accordance with FIG. 6a, the spoke 11 of the wing of the device may have, at an annulus 3b, a toothed bar arrangement 25b comprising a toothed gear and a toothed bar to change the position (angle) of the wing. The position of the wing changes by means of the toothed bar and toothed gear when the force of water moves the idler wheels 8b in relation to the annulus 3b by pushing. Double arrow D illustrates the shifting of the idler wheels 8b in relation to the annulus 3b and the spoke 11 of the wing 4b resting on it. FIGS. 6a and 6b further illustrate that on the outer periphery at the wing spoke 11b end there may be a remote-controlled brake device 15b by means of which the wing 4b may be controllably stopped at different turning angles and by means of which the wing may also be released. The spoke of each wing 4b has such a brake device 15b. The pressure sensor 5b reacts to the magnitude of water flow. The signal originating from the pressure sensor 5b is utilised to give a command to the brake device 15b to release and lock the wing so that the operation of the device is in line with the changes in water flow. Said command is preferably computer controlled for optimizing the functioning of the device in such a way that as much energy as possible can be retrieved from the water flow. According to FIG. 6b the idler wheels 8b are bound to each other. The binding member may preferably be an axle that prevents the idler wheels 8b from causing friction on the annulus 3b when the idler wheels are moving. Marking B-B in FIG. 6b illustrates the point at which a view of the kind in FIG. 6a comes into view by looking at FIG. 6b. Double arrow E illustrates the rotation (turning) of the wing 4b. The device of FIGS. 6a to 6c is preferably provided with a guide tube according to FIG. 5 (cf. guide tube 19''' of FIG. 5; not shown in FIGS. 6a to 6c). Like in the other implementations of the invention, a rotor (not shown in FIG. 6a or 6b) only rotates in one direction, indicated by arrow A in FIGS. 6b and 6c.

It will be apparent to a person skilled in the art that as technology advances, the basic idea of the invention may be implemented in many different ways. In some cases, features disclosed in this application may be used as such, regardless of other features. On the other hand, features disclosed in this application can be combined, if necessary, to form various combinations. The invention and its embodiments are thus not restricted to the above-described examples provided for the sake of illustration, but the invention may vary within the scope of the claims.

REFERENCE MARKINGS

1; 1'; 1''; 1''' drum
2; 2'; 2''; 2''' electric generator
3; 3'; 3b annulus
4; 4'; 4''; 4'''; 4b wing
5; 5'; 5''', 5b pressure sensor
6; 6'; 6''' transmission
7; 7'; 7''' flywheel
8; 8'; 8b idler wheel
9' pivot arrangement
10 pivot arm
11; 11'; 11b spoke
12 bevel gear
13 large bevel gear
14 adjustment bevel gear
15; 15b brake device
16; 16'; 16''' support structure
17 adapter
18'' limiter
19''; 19''' guide tube
20''; 20''' guide cone
21''' body ring
22''' support plate
23''' gas container
24''' body part
25b toothed bar arrangement
100; 100'; 100''' device
A; A''; A''' first rotation direction
B''' double arrow indicating turning
B-B cross cut
C''' double arrow illustrating tilting
D double arrow illustrating the shifting of the idler wheels 8b in relation to the annulus 3b
E double arrow illustrating the turning of the wing 4b.
K'' double arrow illustrating turning of wings 4''
X-X, X'-X' centre axis of drum 1; 1'
X''-X''; X'''-X''' centre axis of drum 1''; 1'''
X1 first rotating direction
X2 second rotation direction
$X_3'''-X_3'''$ horizontal axis related to tilting the device 100'''
$Y_1'''-Y_1'''$ vertical axis of support structure 16'''

The invention claimed is:

1. A device for recovering wave energy, the device comprising:
a drum which is configured to rotate around a drum center axis; and
an electric generator inside the drum, wherein electric generator is arranged to be rotated by a rotational motion of said drum;
at least one wing on the outside of the drum to receive a motion of water, the wing being configured to turn so that the wing may turn from a first position to a second position, whereby as the wing is in the first position, the motion of water in a first direction of the drum center axis is arranged to rotate the drum in a first direction, and as the wing is in the second position, the motion of water in a second direction of the drum center axis is also arranged to rotate the drum in said first direction, and wherein further the turning of the wing being arranged to take place under control of a pressure sensor; and
an annulus which is located at a distance from the drum and configured to rotate fixedly with the drum around the drum center axis, wherein the at least one wing is configured between the drum and the annulus, wherein the wing is configured to turn by an idler wheel, the idler wheel being arranged in the direction of the annulus and configured to rotate around the drum center axis, wherein a rotating speed of the idler wheel is arranged to change from a rotating speed slower than a rotating speed of the annulus to a rotating speed faster than the rotating speed of the annulus and back, and wherein the idler wheel is connected either to i) the wing by a pivot arrangement, which allows the angle of the wing to be changed in relation to the idler wheel, or ii) a pivot arm, a spoke of the pivot arm being is connected to the wing, such that the turning of the spoke also turns the wing.

2. A device as claimed in claim 1, further comprising a transmission which is configured to alter the speed of the rotating motion and to convey the rotating motion of the drum to a rotating motion of the electric generator.

3. A device as claimed in claim 1, wherein the wing is configured to turn between limiters that limit a turning angle of the wing.

4. A device as claimed in claim 1, wherein each wing is coupled to a bevel gear within the drum, the bevel gears being coupled by a tooth contact to each other, wherein
one of the wings is additionally connected to a large bevel gear to rotate with the large bevel gear, said large bevel gear being meshed with an adjustment bevel gear configured concentrically with the drum axis and arranged perpendicularly in relation to the large bevel gear, the rotating speed of the adjustment bevel gear being configured to be slowed down by a brake device, the brake device being controlled by said pressure sensor.

5. A device as claimed in claim 1, wherein the drum is fastened to and supported by a body part, which is fixed to a support structure of the device and configured to turn in relation to the support structure so that the drum may turn back and forth in relation to an vertical axis of the support structure, and wherein the drum is additionally configured to be tilted in relation to the support structure.

6. A device as claimed in claim 1, further comprising a toothed bar arrangement fixed to a spoke of the wing.

7. A device as claimed in claim 6, further comprising a brake device configured to lock an angle of the wing and configured to release the angle of the wing.

* * * * *